UNITED STATES PATENT OFFICE.

HENRI MARCHE, OF FOURMIES, FRANCE.

MANUFACTURE OF VELVET, PLUSH, CARPET, IMITATION FUR, AND THE LIKE.

1,012,389.     Specification of Letters Patent.     Patented Dec. 19, 1911.

No Drawing.     Application filed March 11, 1911. Serial No. 613,784.

*To all whom it may concern:*

Be it known that I, HENRI MARCHE, a citizen of the French Republic, residing at Fourmies, Nord, France, have invented certain new and useful Improvements in the Manufacture of Velvet, Plush, Carpets, Imitation Fur, and the Like, of which the following is a specification.

This process is based on the freezing of masses of threads, fibers, etc., of all colors and kinds, at any stage of preparation, such as spun, twisted, combed, carded, etc., and their subsequent transfer in any thickness to any woven fabrics or supports to which they are secured by means of agglutinants such as glue, rubber solution, etc.

The process according to this invention is similar to that which relates to the treatment of furs described in a co-pending application Serial No. 613785. This process is moreover very economical as it enables waste and threads or fibers which can not be used in the present manufacture of velvet, to be utilized, and thin and cheap fabrics to be used as the background or supporting fabric for hairs or fibers, while velvet, plush, etc., as at present manufactured, have to be made with backgrounds or supporting fabrics which are very expensive in view of their thickness and market value.

For obtaining velvet, plush, carpets, etc., by this process the process is carried on in the following manner: Parallel threads or fibers of any color, nature and design, are arranged in more or less close layers. These fibers or threads are made parallel by any well known means such as cards, combing machines, drawing apparatus, etc., and then compressed. This mass of threads of any thickness and length having been thus prepared, is dipped into a reservoir filled with water, and the whole is frozen so as to form a block of ice. The said block inclosing the threads or fibers, is then sawed or cut into pieces of suitable dimensions for the products to be obtained, at a right angle to the general directions of the threads or at a certain angle. It is then merely necessary to melt the ice on one of its faces, so as to uncover a small portion of the length of threads, fibers, etc., of small length thus obtained, and to secure them to any support such as silk- wool- cotton- ramie-, etc., fabric by means of glue, rubber solution, etc. The ice surrounding the upper portion of the threads is then melted, the product of the threads is then melted, the product dried, and is ready for all the necessary finishing operations. The short threads or fibers thus obtained can be secured to extensible film-like supports, so as to enable fabrics having a greater surface than the original surface of the material deposited on the same to be produced.

What I claim as my invention and desire to secure by Letters Patent is:—

1. A method of manufacturing velvet, plush, carpets, imitation fur and the like, which consists in parallelly arranging a mass of threads in layers of any desired density and length, treating the same with water, and freezing, then partly melting away the ice on one face, then securing the threads together and attaching them to a suitable support by an adhesive, and finally melting away the remainder of the ice.

2. A method of manufacturing velvet, plush, carpets, imitation fur and the like, which consists in parallelly arranging a mass of fibers in layers of any desired density and length, treating the same with a liquid, freezing and cutting into convenient pieces, partly melting one face of each piece, securing the fibers together and attaching them to a suitable support by an adhesive, then melting the remainder of the frozen liquid away and drying and subjecting the product to a suitable finishing treatment.

In testimony whereof I have signed my name to this specification in the presence of two subscribing witnesses.

HENRI MARCHE.

Witnesses:
 GEORGE FANGÉR,
 LEON BÉROT.